United States Patent [19]

Simon et al.

[11] 4,442,496

[45] Apr. 10, 1984

[54] RADIATION ENERGY MEASUREMENT APPARATUS

[75] Inventors: William E. Simon, Cleveland; Richard D. Richards, Bay Village, both of Ohio

[73] Assignee: Victoreen, Inc., Cleveland, Ohio

[21] Appl. No.: 446,501

[22] Filed: Dec. 3, 1982

Related U.S. Application Data

[63] Continuation of Ser. No. 173,661, Jul. 29, 1980, abandoned.

[51] Int. Cl.³ ............................................. G01D 18/00
[52] U.S. Cl. ................................ 364/524; 250/252.1; 364/483
[58] Field of Search ................ 364/483, 524; 250/252, 250/358 R, 401, 402, 405, 252.1

[56] References Cited

U.S. PATENT DOCUMENTS

| | | | |
|---|---|---|---|
| 2,539,203 | 1/1951 | Pohl | 250/71 |
| 2,985,761 | 5/1961 | Ohmart | 250/95 |
| 3,766,383 | 10/1973 | Harris et al. | 250/51.5 |
| 3,955,086 | 5/1976 | Tsujii et al. | 250/358 R |
| 4,097,736 | 6/1978 | Jacobson et al. | 250/252 |
| 4,189,645 | 2/1980 | Chaney et al. | 250/252 X |
| 4,203,033 | 5/1980 | Jacobson | 250/252 |

OTHER PUBLICATIONS

Cooke et al., "A Method for Field Measurement of Diagnostic X-Ray Tube Potential", Draft of Oral Presentation on Jun. 17-21, 1973 Before the 18th Annual Meeting of the Health Physics Society in Miami Beach, Fla.

Daniels et al., "Digital Acquisition System for Measurement of Time Varying X-Radiation Fields", *Nuclear Instruments and Methods*, vol. 143, 1977, pp. 187-194.

Edward L. Chaney, "An Instrument with Digital Readout for Indirect Determination of kVp", Mar./Apr. 1978, pp. 141-145.

*Primary Examiner*—Charles E. Atkinson
*Attorney, Agent, or Firm*—Yount & Tarolli

[57] ABSTRACT

A radiation analysis instrument is described for measuring the characteristics of radiation emanating from a source (XS). The instrument includes two absorbers (a, b) and corresponding detectors (10, 12) with the detectors being disposed in the path of the radiation and the absorbers being interposed between the corresponding detector and the source. A circuit (16) digitizes the analog signals derived by the two detectors and provides the digital values to a microcomputer (18) which stores these digitals values within a memory (50). A microprocessor (48) processes the digital signals stored within the memory (50) to analyze characteristics of the radiation emitted from and the potential applied across the source (XS). This instrument is particularly useful in measuring the kVp applied to X-ray tubes.

6 Claims, 4 Drawing Figures

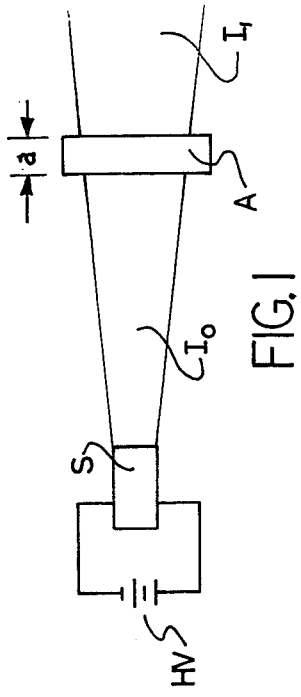
FIG.1
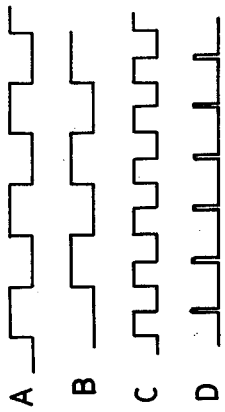
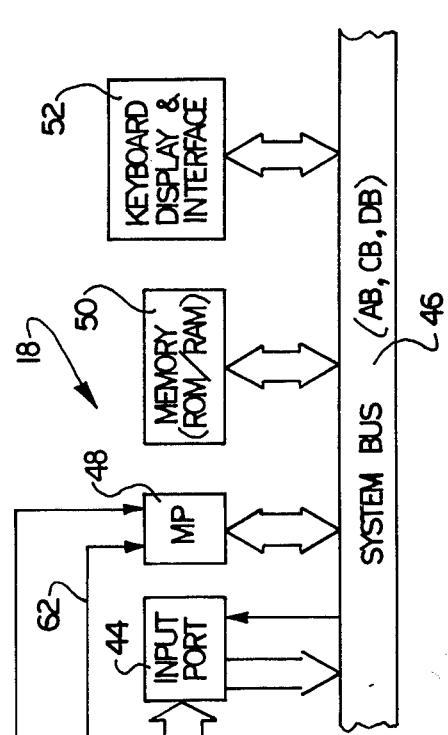
FIG.2
FIG.3
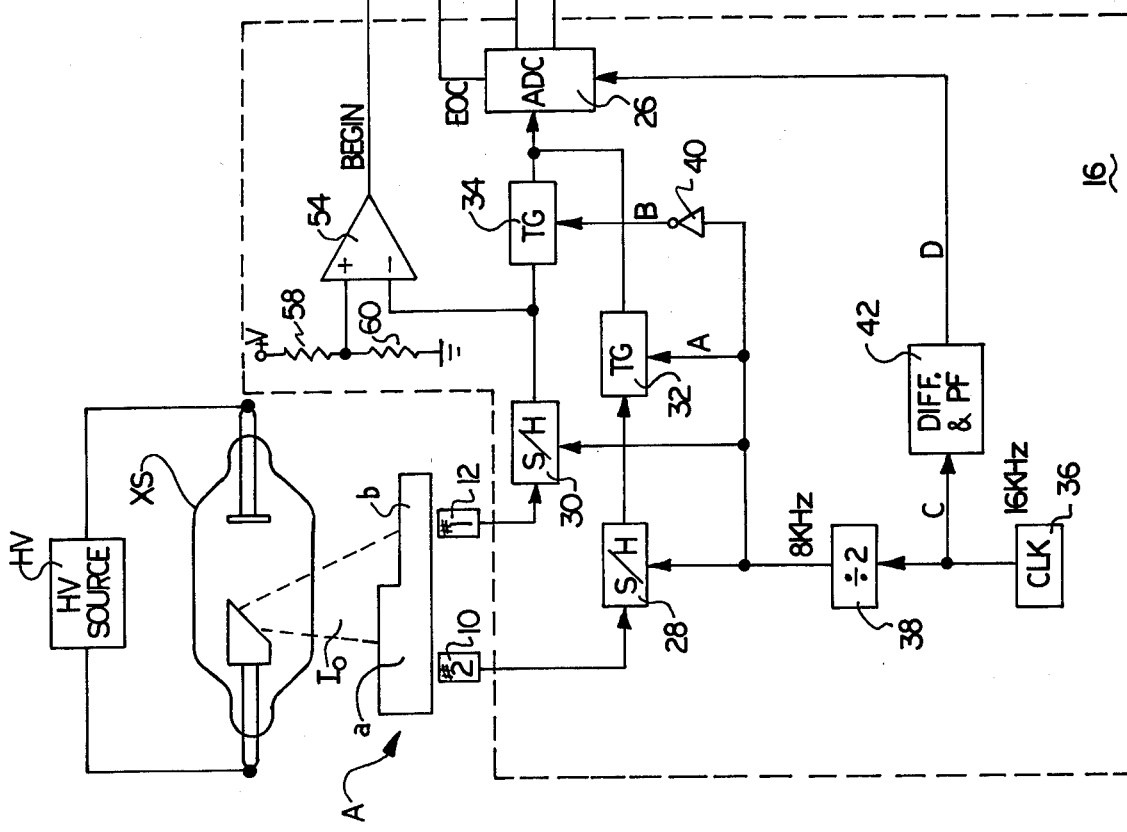

RADIATION ENERGY MEASUREMENT APPARATUS

This is a continuation of application Ser. No. 173,661 filed July 29, 1980 (now abandoned).

The present invention relates to apparatus for analyzing radiation emitted by a radiation source, such as an X-ray tube, and more particularly to such apparatus which utilizes this radiation analysis to determine the magnitude of the electrical potential applied across the radiation source.

In the operation of radiation generating devices, such as medical diagnostic X-ray machines, the energy level of the emitted particles (generally photons) is of interest since it determines the penetration depth of the radiation, the hazard levels of persons exposed to the radiation, etc. The energy level of the radiation emitted by the radiation source is generally directly related to the electrical potential applied across the source. It has therefore been the practice to regulate the energy of the emitted radiation by regulating the magnitude of the potential applied to the radiation source.

It is common to specify the voltage setting of an X-ray generator in terms of the peak voltage reached during the interval in which the X-ray source is energized. This voltage, referred to as the peak kilovoltage or kVp, is widely used as a specification for radiographic procedures. The high voltage control for the X-ray generator is thus usually graduated in terms of kVp. It is desireable to occasionally verify the calibration of the high voltage control by comparing the actual applied kVp with the control setting which produced that reading. To do this it is of course necessary to determine the actual applied kVp.

One method of accomplishing this is to directly measure the voltage appearing across the radiation source with a high voltage probe. Although simple in theory, this technique is quite difficult in practice due to the magnitude of this voltage (which may be well in excess of 50 kilovolts). Another technique involves an indirect measurement of the applied kVp through measurement of the peak energy of the radiation emanating from the radiation source.

The measurement of kVp is complicated by the complexity of the waveform of the applied voltage. Ideally, the voltage applied to the radiation source by the high voltage power supply will be strictly D.C., having no time varying components. In this case the kVp and D.C. voltage are the same. Usually, however, the high voltage power supplies which are used to energize the radiation sources provide high voltage D.C. potentials having any number of different time varying components of varying magnitudes and frequencies. This is because, e.g., the amount of regulation provided in different high voltage supplies may differ, some power supplies may be operated from a single phase power line where others are operated from a three phase power line, etc. In these cases the kVp will differ by varying amounts from the D.C. voltage. The measurement technique must therefore either be capable of distinguishing kVp from D.C. or else include some means for inferring kVp from D.C. for a given X-ray unit.

One method of determining kVp is described in the U.S. patent to Jacobson et al., U.S. Pat. No. 4,097,736. In this patent, a device is provided which includes a plurality of radiation detectors, each having an associated absorber disposed between it and the souce of radiation. Analog peak detector circuits are connected to the output of the radiation detectors and detect the peak signals provided by the radiation detectors. The apparatus utilizes these signal peaks to provide a read out which is indicative of kVp.

A second method is described in a paper entitled "A Method for Field Measurement of Diagnostic X-Ray Tube Potential", which was orally presented before the 18th annual meeting of the Health Physics Society in Miami Beach, Fla., on June 17-21, 1973. This article describes a technique of determining kVp based upon the ratio of the radiation intensities measured behind two different absorber thicknesses. The article teaches that there is a direct correlation between this ratio and the kVp of the radiation source.

SUMMARY OF THE INVENTION

The X-ray radiation energy measurement apparatus of the present invention provides a means for measuring the peak energy of radiation emanating from a source, thereby indirectly measuring the kVp applied to the radiation source. It also permits analysis of other characteristics of the radiation energy and source potential. The apparatus is easy to use and avoids the high voltage generator loading, danger of shocks, etc., inherent in any direct measurement technique. Moreover, the measurement derived by the unit is immediately available to the operator, unlike certain prior techniques wherein the measurement process took an extended period of time due to the need to, for example, develop film which had been exposed to the radiation.

In accordance with the present invention, apparatus is provided for determining the peak energy of radiation being emitted by a radiation source whose output of radiation energy varies with time. The apparatus includes at least two radiation detectors adapted to be disposed in the path of the radiation emitted by the radiation source, with each detector providing a respective analog signal having a value which varies in a known relation to the intensity of the radiation. A radiation absorber is associated with each of the detectors and is adapted to be disposed between the corresponding detector and the radiation source for absorbing a portion of the radiation emitted from the source. The absorbers have different radiation absorption values, and in each case a portion of the radiation absorbed by the absorber varies with the energy of the radiation. Means is provided which is responsive to the first and second analog signals which are provided by the two radiation detectors for providing corresponding first and second digital signals, where each of the digital signals has digital values which represent and vary with a corresponding one of the analog signals. A digital memory is provided for storing digital values of each of the digital signals which occur at regular time intervals. Finally, processing means is provided for processing the stored digital value to determine the energy level of the radiation emitted from the radiation source.

In accordance with another aspect of the present invention, apparatus is provided for analyzing radiation emitted by a radiation source whose output radiation energy varies with time. Radiation absorber means is included which is adapted to be illuminated by the radiation to be analyzed, including first and second absorber means having different absorption values. Moreover, first and second radiation detector means are provided for detecting the portion of the radiation transmitted by the first and second absorber means, respectively, and for providing corresponding first and second electrical signals having values which vary in accordance with variations with time of the respectively detected radiation portion. The apparatus further includes means responsive to the first and second electrical signals for deriving a ratio signal which varies in accordance with the ratio of the first and second signals and which therefore varies in accordance with the time varying energy of the radiation and for processing the ratio signal to analyze the radiation emitted by the radiation source.

BRIEF DESCRIPTION OF THE DRAWINGS

The foregoing and other objects and advantages of the present invention will become more readily apparent from the following detailed description, as taken in conjunction with the accompanying drawings, wherein:

FIG. 1 is a schematic representation of a source and an absorber is useful in understanding the principles of the present invention;

FIG. 2 is a broad block diagram of a radiation energy measurement instrument in accordance with the teachings of the present invention;

FIG. 3 is a timing diagram useful in understanding the operation of the apparatus of FIG. 2.

DETAILED DESCRIPTION

Figure 4:
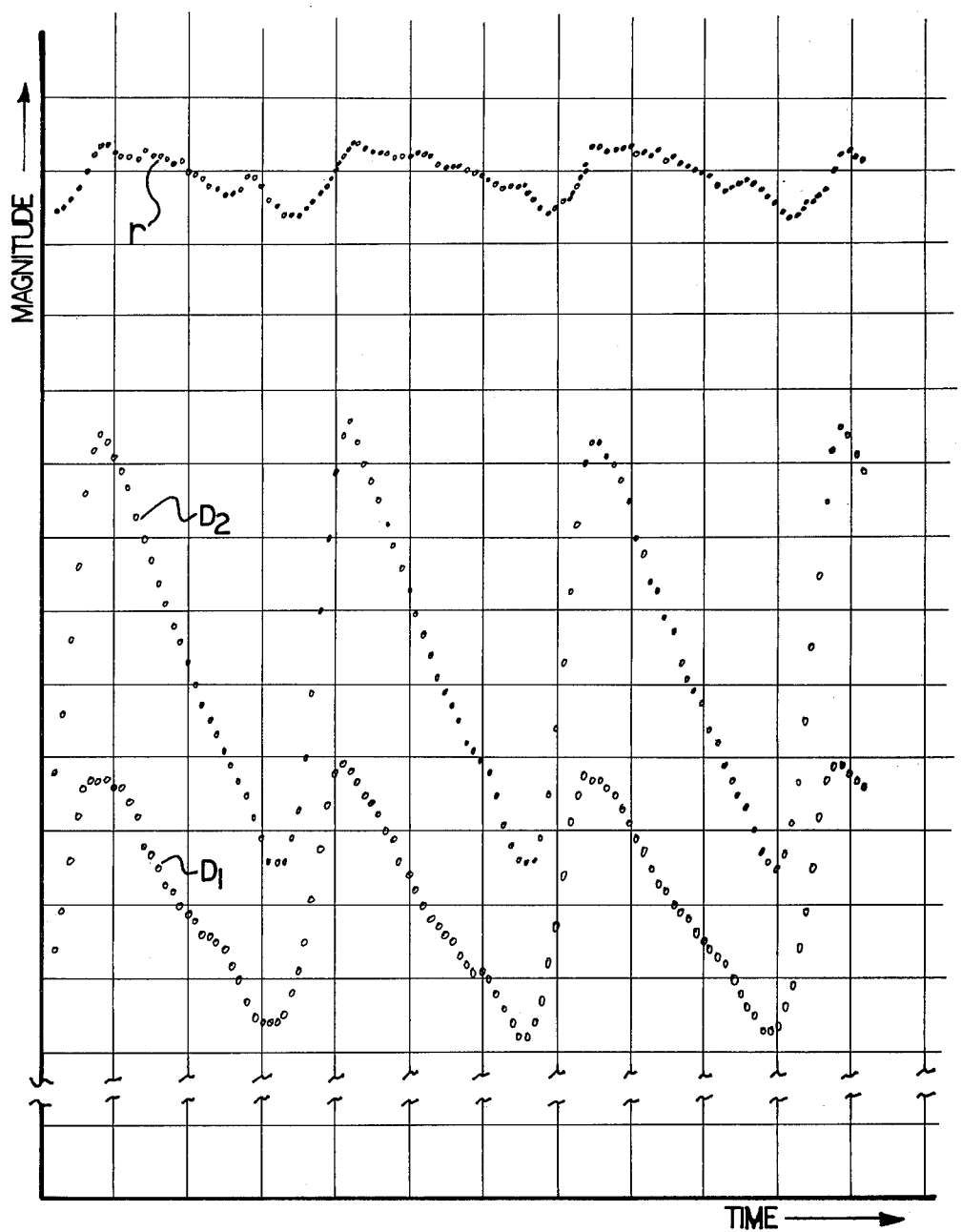
FIG. 4 is a graphical representation of the data acquired by the apparatus of FIG. 2.

Before proceeding with a description of the present invention, it will first be useful to review some of the principles involved in the operation of apparatus in accordance with the invention. As may be more readily understood from the following greatly simplified discussion of FIG. 1, the ratio of intensities of radiation passing through two different absorber thicknesses is generally directly indicative of the energy of the radiation illuminating the absorbers, and thus of the voltage applied to the radiation source.

In FIG. 1 there is illustrated a radiation source S (which may be an X-ray tube, for example), which is powered by a high voltage supply HV. The source S emits a beam of radiation having an intensity $I_0$. An absorber A is disposed in the path of the beam, and has a thickness "a". If the intensity of the beam on the leeward side of the absorber A is designated $I_1$, then:

$$I_1 = I_0 e^{-ua} \quad (1)$$

Where $I_0$, I, and "a" are as defined above and "u" is the energy-dependent absorption function of the absorber A.

If, now, the absorber A is replaced by a second absorber having a thickness "b", then the intensity of the radiation at the far side of the absorber will, of course, have a different value $I_2$. Thus:

$$I_2 = I_0 e^{-ub} \quad (2)$$

If equation (1) is now divided by equation (2), then:

$$I_1/I_2 = e^{-u(a-b)} \quad (3)$$

Since the difference in the thicknesses of the two absorbers (a−b) is a constant, the ratio of $I_1$ to $I_2$ is dependent only upon the value of the absorption function "u" of the particular material or materials of which the absorber A is constructed. The value of this absorption function, however, may be considered to be functionally dependent upon only the energy of the incident radiation, and thus upon the potential applied to the radiation source. Thus the ratio of $I_1$ to $I_2$ (hereinafter referred to as "r") is indicative of the voltage applied to the radiation source, and can be directly correlated thereto.

This, of course, is a greatly simplified treatment of the processes involved and does not completely accurately reflect the system behavior in all circumstances, due principally to the less well defined relationship between the absorption function and the beam intensity and energy. These complications can largely be ignored, however, if absorbers are used whose absorption function values change rapidly in the energy range of interest.

It is this general principle which is utilized in the radiation energy measurement apparatus of FIG. 2. The following description will largely relate to the analysis of X-rays and their associated sources, however the instrument may also be used to analyze many different types of ionizing radiation.

In FIG. 2 the radiation source S is illustrated as an X-ray tube XS having a high voltage signal applied thereacross by a high voltage source HV. The X-ray tube XS emits a beam of X-rays $I_0$. Interposed in the path of the beam is an absorber A having two different thicknesses "a" and "b". The intensities of the radiation transmitted through the two thicknesses "a" and "b" of the absorber A are respectively detected by detectors 10 and 12. These detectors will preferably each comprise a cesium iodide scintillation crystal optically coupled to a photo diode, although other types of detectors could of course be used. These detectors provide analog output signals whose values are directly related to the intensity of the radiation incident thereon. Hence, by measuring these values and determining the ratios thereof, a ratio r can be derived which can be directly correlated to the potential applied to the X-ray tube XS by the high voltage source HV. Moreover, if the apparatus which responds to the detector outputs if responsive to the peak signals provided thereby, then the ratio of these peak values will correspond to the kVp, or peak electrical potential applied to the X-ray tube XS. As stated previously, this kVp value is widely used and is of much interest.

In the FIG. 2 embodiment of the present invention, the outputs of the two detectors are digitized to form streams of digital signals whose values are stored in a digital memory, with these stored values then being processed by processor means so as to determine the ratio of the peak values thereof and to determine from this ratio the kVp applied to the X-ray source XS. The apparatus of FIG. 2 therefore includes a circuit 16 for digitizing the outputs of the detector apparatus, and a microcomputer 18 for storing and processing these digital values.

The purpose of the circuit 16 is to periodically sample and digitize the analog outputs of detectors 10 and 12. To this end, an analog/digital converter 26 is provided. The outputs of the two detectors 10 and 12 are alternately provided to the analog-to-digital converter 26 and are digitized thereby. The outputs of the detectors 10 and 12 are connected to the input of the converter 26 through respective sample-and-hold circuit 28 and 30 and transmission gates 32 and 34. The sample-and-hold circuits 28 and 30 each sample the output of their associated detector and maintain these sampled values at a constant level while the converter 26 is in the process of converting that level into a corresponding digital signal.

The transmission gates, on the other hand, are provided for gating these sampled-and-held signals to the converter 26 one at a time.

The sequence of operation of the sample-and-hold circuits and transmission gates is controlled by a clock 36 which provides a 16 kHz squarewave signal at its output. A divider circuit 38 divides this clock signal in half, thereby providing an 8 kHz squarewave signal at its output. This 8 kHz signal is directly supplied to the control inputs of the two sample-and-hold circuits 28 and 30.

In the embodiment illustrated, the sample-and-hold circuits 28 and 30 are triggered to sample-and-hold their corresponding detector output upon each rising edge of the 8 kHz clock signal. Thus, with each rising edge of the clock, the sample-and-hold circuits 28 and 30 will each sample the output of the corresponding detector, transfer this sampled analog signal to the output thereof, and hold the output at that value until the next rising clock edge appears. Consequently, the outputs of the two detectors 10 and 12 are simultaneously sampled by the two sample-and-hold circuits 28 and 30.

The transmission gates 32 and 34 will preferably be conventional solid state analog switches which are "open" whenever the logic signal applied to the control input thereof is at a low logic level, and which will be "closed" whenever this control signal has a high logic level. The 8 kHz clock signal is applied directly to the transmission gate 32; the output of sample-and-hold circuit 28 is thus connected to the input of converter 26 during those intervals in which the clock signal is at a high logic level. The 8 kHz clock signal is applied to the transmission gate 34, on the other hand, through a logic inverter 40. The output of sample-and-hold circuit 30 is therefore connected to the output of converter 26 during those intervals in which the 8 kHz clock signal has a low logic level. Because of this, the outputs of sample-and-hold circuits 28 and 30 are connected to the input of converter 26 on alternate clock half-cycles.

The analog-to-digital converter 26 is triggered to convert the signal then at its input into a digital value in mid-clock cycle so that transients associated with the switching of the transmission gates and the sample-and-hold circuits will have settled. This "convert" signal is derived from the 16 kHz clock provided at the output of clock 36, as differentiated and formed by a differentiation and pulse forming circuit 42. The circuit 42 responds to the falling edges of the 16 kHz clock signal to generate a short pulse, with these pulses being applied to the trigger or "convert" input of the converter 26. Upon the receipt of each of these convert pulses, the analog-to-digital converter will convert the analog value then appearing at its input into a corresponding digital word. This digital word is then presented at its output. Thus, the analog-to-digital converter 26 provides a sequence of digital words at its output, with these digital words alternately representing the value of the outputs of detectors 10 and 12.

The output of the converter 26 is interfaced with the microcomputer 18 via an input port 44. This input port communicates with the system bus 46 which, as is conventional, includes an address bus, data bus, and control bus. This system bus interconnects the various elements of the microcomputer 18, including a microprocessor 48, memory 50, and a keyboard, display, and interface circuit 52.

The microprocessor 48 operates under control of a program stored within a permanent portion of the memory 50, known as read-only-memory (ROM). Generally, the function of the microcomputer 18 is to store the digital values presented by converter 26 in a random-access portion (RAM) of memory 50, and to then process the stored data to determine kVp and other things.

When it is desired to determine the kVp output of the X-ray tube XS, the operator will start the microcomputer 18 by depressing an appropriate button on the keyboard 52, which the microprocessor 48 is scanning at this time. After being started in this fashion, the microprocessor will wait for a "begin" signal to be provided thereto by the digitization circuitry 16. This "begin" signal is derived from a comparator 54 which monitors the output of sample-and-hold circuit 30 to determine when the X-ray tube has been energized. The comparator 54, more specifically, compares the output of sample-and-hold circuit 30 with a fixed reference voltage provided by a voltage divider consisting of resistors 60 and 58, connected in series across the +V power supply. The comparator provides a low logic level at its output when the output of sample-and-hold circuit 30 exceeds this reference voltage. The output of comparator 54 is connected to an "interrupt" input of the microprocessor 48.

The microprocessor 48 responds to this low "interrupt" signal to initiate the collection of data. Thereafter, each time the analog-to-digital converter 26 indicates to the microprocessor 48 that it has completed a conversion of an analog value to a digital value (by providing a low logic level signal on an EOC control line 62, also connected to an interrupt input of microprocessor 48) the microprocessor will read the output of the converter 26 and will load that digital word into the RAM portion of memory 50. To do this, the microprocessor 48 enables the input port 44, thereby connecting the output of the converter 26 to the system bus 46. The microprocessor then reads the output of the converter 26 and stores it within a location within the random-access-memory (RAM) portion of memory 50. Sequential outputs of the converter 26 are stored in sequential locations within the memory 50. The collection of data will continue in this fashion until the microprocessor 48 determines that a specified number of data points have been collected (i.e., a specified number of digital values have been stored in memory).

The data collected will have a form such as that illustrated in FIG. 4. In FIG. 4 the waveform $D_1$ represents the output of detector 10, whereas the waveform $D_2$ represents the output of detector 12 (and is shown in expanded scale, i.e., multiplied by a factor 4). As is apparent from these waveforms, the digital data collected essentially represents a large number of data points collected at time intervals which are much shorter than the amount of time necessary for the corresponding analog signal to change significantly. These digital signals therefore completely characterize the analog detector output signals.

After completing the data collection routine, the microprocessor proceeds with the analysis of the data. The microprocessor first scans through the data, dividing each of the data points of waveform $D_1$ by the corresponding data point of waveform $D_2$. The resulting series of ratio values are stored within a separate sequential block of the RAM portion of the memory. The waveform "r" represented by these ratio values is indicated in FIG. 4. The microprocessor then scans through the ratio data points to locate the maximum value. As stated previously, this maximum ratio value may be directly correlated with the kVp applied to the X-ray tube XS by the high voltage source HV. In fact, the waveform r of FIG. 4 corresponds uniquely with the waveform of the radiation energy and thus the waveform of the potential applied to the X-ray tube 12 by the high voltage source 14.

The actual maximum ratio value will generally occur on the first peak of the stored ratio values. This is apparently due to a tendency of the high voltage power supplies to momentarily "overshoot" the steady state operating potential when first turned on. Since this "overshoot" peak is not truly representative of steady-state kVp, the microprocessor 48 is programmed to ignore the first several peaks in the stored r values. The microprocessor may, in fact, be programmed to locate a specific peak (for example, the third peak in the stored r values) and utilize that peak value (or any group of selected peak values) for kVp determination.

This maximum ratio value may be correlated with a corresponding kVp value by means of a look-up table also stored within the memory 50. This look-up table will have been empirically derived by utilizing the instrument of FIG. 2 to monitor the output of a calibrated radiation source, whose kVp values are therefore known. If desired, this look-up table may include a relatively small number of kVp values and their associated r value, with the microprocessor being programmed to automatically interpolate between the data points on the look-up table.

It is presently preferred, however, that a mathematical relation (such as, for example, a generalized hyperbola) instead be stored within memory, with this relationship selected to mathematically relate an r value to a corresponding kVp value such that by merely plugging the r value into the equation a corresponding kVp value can be determined. The coefficients of this equation will have been determined by matching the coefficients of the generalized equation to empirical data acquired, again, from a calibrated radiation source in the fashion heretofore described.

These coefficients will, of course, depend upon the absorber thicknesses and materials being employed. It will generally be desirable to employ different absorber pairs in different circumstances to permit use of the apparatus with a wide range of X-ray energy levels. Since each different set of absorbers will have its own associated set of coefficients, some means must be provided for advising the microprocessor as to which set of coefficients is being used.

This can be accomplished by having the operator enter a code identifying the absorber pair in use through the keyboard 52, or by having the absorber pair, themselves coded such that installation of the absorber pair on the instrument automatically enters a code into the microcomputer 10 identifying which absorbers have been mounted thereon. In either case the microprocessor will utilize the code to locate the associated coefficients, and calculate a kVp value based upon these coefficients, the r value, and the stored functional relationship. The resulting kVp value will be outputted to the circuit 52 for display to the operator.

Since the r waveform stored within the memory 50 corresponds with the voltage applied to the X-ray tube 12 by the HV source 14, the microprocessor is also capable of providing diagnostic analysis of the HV source by merely analyzing this r waveform or the detector output waveforms. For example, the microprocessor can count the number of peaks occurring in a known time interval, thereby providing an indication of the number of phases of the power line which are contributing to the development of a high voltage signal across the X-ray tube 12. Similarly, the microprocessor can determine the magnitude of the "ripple" on this high voltage signal by determining the difference between the peaks and valleys of these r waveforms and correlating this to a kilovoltage reading.

In addition to the diagnostics, the storage of the waveform within memory permits the microprocessor to determine characteristics of the radiation other than kVp, such as average radiation intensity, etc. Moreover, it is not necessary for the operator to take plural "shots" (exposures) with the X-ray machine in order to perform more than one of these functions; the same stored data may be used for all different functions.

Thus, the digitization and storage of the outputs of the two sensors 10 and 12 permits extensive flexibility in the diagnostics and measurement capabilities of the instrument.

Although the invention has been described with respect to a preferred embodiment, it will be appreciated that various rearrangements and alterations of parts may be made without departing from the spirit and scope of the present invention, as defined in the appended claims.

What is claimed is:

1. Apparatus for determining the peak energy of radiation being emitted by a radiation source whose output radiation energy varies with time in a cyclical manner, comprising:

at least fire and second radiation detector means adapted to be disposed in the path of radiation emitted by said radiation source for providing respective first and second analog signals having values which vary in known relation to the intensity of said radiation;

at least first and second radiation absorber means for each absorbing a corresponding portion of said radiation, each adapted to be disposed between said radiation source and a corresponding one of said first and second detector means, wherein the portion of said radiation absorbed varies with the energy of said radiation, said first and second absorber means having different radiation absorption values;

means responsive to said first and second analog signals for sampling and digitizing each said signal at regular time intervals smaller than the time required for the radiation level to vary substantially, so as to thereby provide first and second digital signals, each having digital values which represent and vary with a corresponding one of said first and second analog signals;

digital memory means for storing the digital values of each of said digital signals taken over a plurality of cycles of said radiation energy; and computer means for digitally processing said stored digital values to determine the peak energy level of said radiation.

2. Apparatus as set forth in claim 1, wherein said means for processing said stored digital values includes means for dividing each of said first digital signals by a corresponding one of said second digital signals so as to thereby provide ratio digital signals having values which indicate and vary with said time variations of said output radiation energy, and means for analyzing said ratio digital signals so as to thereby analyze said output radiation energy.

3. Apparatus as set forth in claim 2, for use with a radiation source which comprises an X-ray tube across which a high voltage electrical signal is applied, the kVp of said high voltage electrical signal determining the peak of said output radiation energy, and wherein said means for analyzing said ratio digital signals comprises means for determining the kVp from said ratio digital signals.

4. Apparatus as set forth in claim 2, wherein said processing means comprises programmed computer means, said computer being programmed to function as both said means for dividing and as said means for analyzing.

5. Apparatus as set forth in claim 2, for use with a radiation source which comprises an X-ray tube across which a high voltage electrical potential is applied, the magnitude of said high voltage electrical potential being directly related to the energy of said output radiation, and wherein said means for analyzing said ratio digital signals comprises means for analyzing a characteristic of said high voltage electrical potential by analyzing the corresponding characteristic of said ratio digital signals.

6. Apparatus for determining the peak energy of radiation being emitted by a radiation source whose output radiation energy varies cyclically with time, comprising:

at least first and second radiation detector means adapted to be disposed in the path of radiation emitted by said radiation source for providing respective first and second analog signals having values which vary in known relation to the intensity of said radiation;

at least first and second radiation absorber means for each absorbing a corresponding portion of said radiation, each adapted to be disposed between said radiation source and a corresponding one of said first and second detector means, wherein the portion of said radiation absorbed varies with the energy of said radiation, said first and second absorber means having different radiation absorption values;

means responsive to said first and second analog signals for sampling and digitizing each said signal at regular time intervals smaller than the time required for the radiation level to vary substantially so as to thereby provide first and second digital signals, each having digital values which represent and vary with a corresponding one of said first and second analog signals;

digital memory means for storing the digital values of each of said digital signals; and, means for processing said stored digital values to provide a ratio value corresponding to a predetermined peak value after the first peak value of the ratio of said two digital signals.

* * * * *

UNITED STATES PATENT AND TRADEMARK OFFICE
CERTIFICATE OF CORRECTION

PATENT NO. : 4,442,496
DATED : April 10, 1984
INVENTOR(S) : William E. Simon and Richard D. Richards It is certified that error appears in the above-identified patent and that said Letters Patent are hereby corrected as shown below:

Column 8, line 32 change "fire" to -- first --.

Signed and Sealed this

Tenth Day of July 1984

[SEAL]

Attest:

GERALD J. MOSSINGHOFF

Attesting Officer    Commissioner of Patents and Trademarks